Aug. 17, 1926.  
G. H. BENEDICT  
1,596,142  
APPARATUS FOR PRESERVING EGGS  
Original Filed Feb. 14, 1922   2 Sheets-Sheet 1
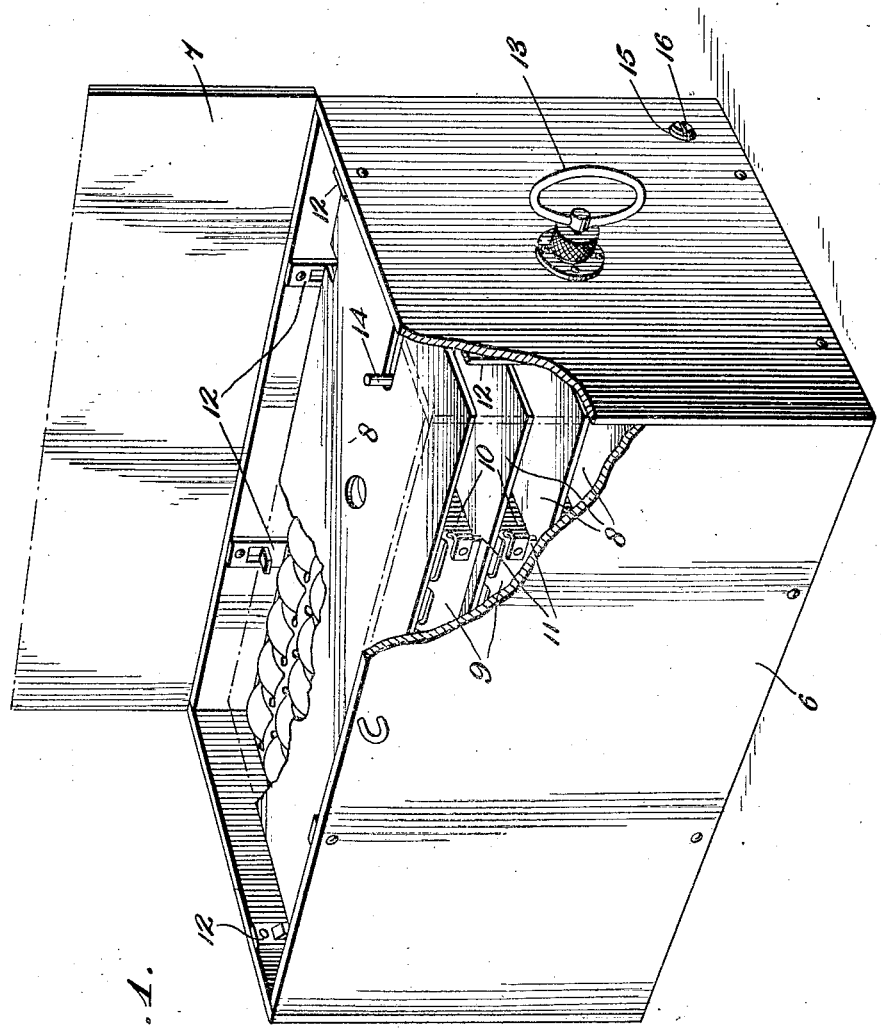
Inventor  
George H. Benedict,  
By Grosse Collings  
Attorneys

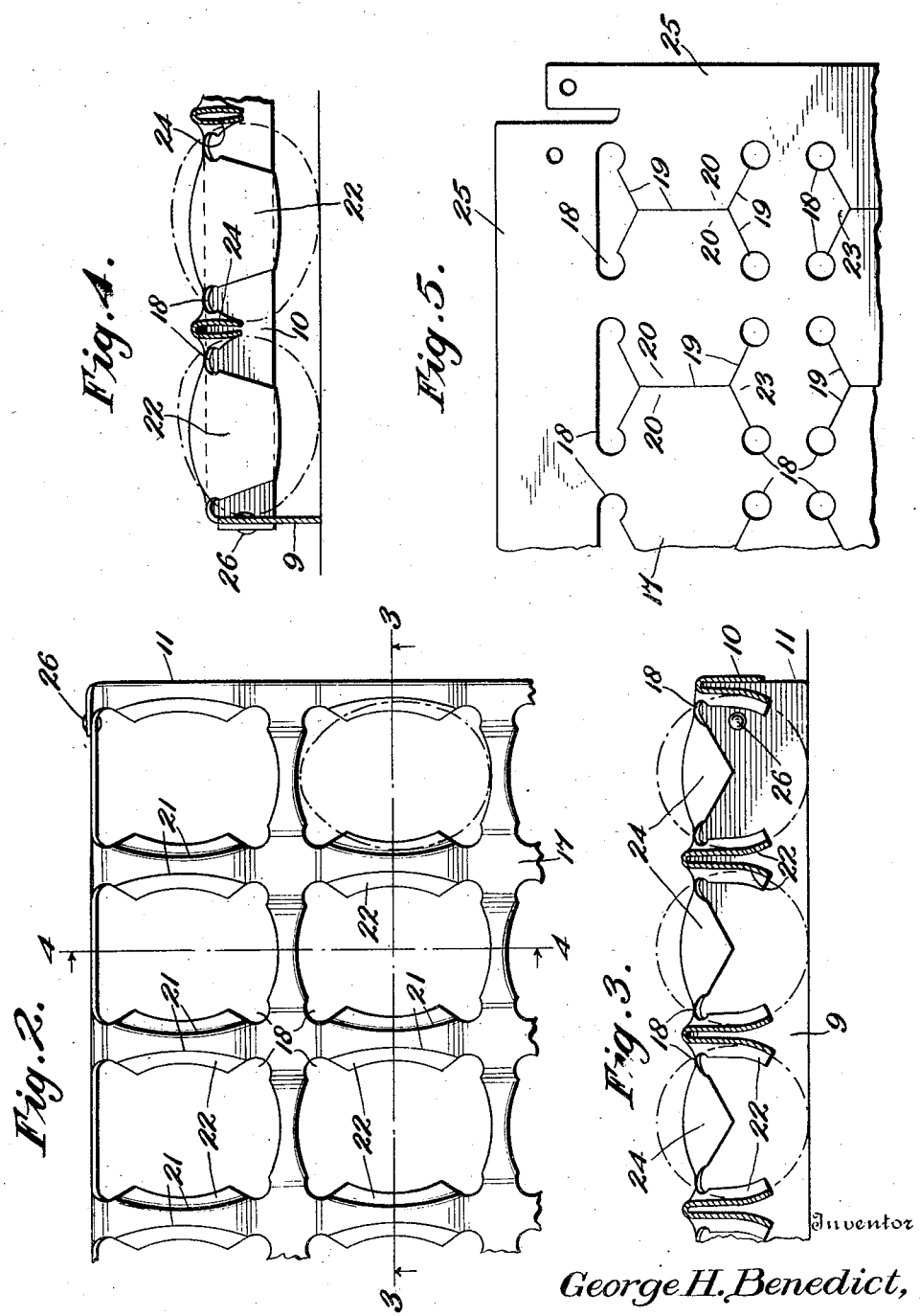

Patented Aug. 17, 1926.

1,596,142

UNITED STATES PATENT OFFICE.

GEORGE H. BENEDICT, OF WASHINGTON, DISTRICT OF COLUMBIA, ASSIGNOR, BY MESNE ASSIGNMENTS, TO AMERICAN WAREHOUSE CORP., OF WASHINGTON, DISTRICT OF COLUMBIA, A CORPORATION OF DELAWARE.

APPARATUS FOR PRESERVING EGGS.

Application filed February 14, 1922, Serial No. 536,492. Renewed January 14, 1926.

This invention relates to improvements in apparatus for preserving food and more especially to apparatus for preserving eggs, and has for its object to improve certain of the prior apparatus which has been heretofore proposed.

A further object of the invention is to provide a device of this character which will be simple in construction, comparatively inexpensive to manufacture, and more efficient in use than the said prior devices of the same type, especially that shown in the prior United States Patent No. 1,302,955, granted May 6, 1919, to E. M. Nichols, entitled Method of and apparatus for preserving eggs.

With these and other objects in view the present invention contemplates an egg-holding tray or frame formed from an integral piece of sheet metal which is so drilled, stamped or otherwise formed as to not only provide a support for the eggs which will prevent them from falling through when the tray is lifted, but which will also effectively prevent the turning of small eggs with their major axes parallel to the direction of motion of the trays.

Referring to the accompanying drawings forming a part of this specification in which like numerals designate like parts in all views—

Figure 1 is a diagrammatic perspective view of an apparatus similar to that disclosed in the said prior Nichols patent, but employing frames or trays constructed in accordance with the present invention.

Fig. 2 is an enlarged fragmentary plan view of a tray made in accordance with this invention.

Fig. 3 is a vertical sectional view of the parts shown in Fig. 2 taken on the line 3—3 of said figure.

Fig. 4 is a transverse vertical sectional view of the parts shown in Fig. 2 taken on line 4—4 of said figure, looking in the direction of the arrows, and Fig. 5 is a fragmentary plan view of the blank from which the finished tray shown in Fig. 2 is formed illustrating the method of drilling or punching the same in order to produce the said finished tray.

Referring more especially to Fig. 1 the numeral 6 indicates any suitable container which is preferably made liquid tight and which is provided with a hinged cover 7 which is adapted to close the upper side of the said container. Removably supported within the said container are a plurality of supporting plates or members 8 upon which are adapted to rest the side and end walls 9 and 10 of the egg trays 11. Any suitable means such as the stamped metal supports 12 may be employed for supporting the plates 8 within the container and in like manner any desired means such as the pull handle 13 operatively connected to the vertically extending rod 14 which engages with the trays 11 may be provided for securing longitudinal movement of the said trays in order to rotate the eggs contained therein. The said container 6 may also be provided with a suitable drain opening 15 normally closed by a plug member 16 as will be clear from Fig. 1.

The egg supporting trays as above disclosed, according to this invention are made from a single sheet of metal 17, see Fig. 5, which sheet may be provided with the openings 18 stamped or drilled therein in any desired manner, which openings are connected by the severed portions 19 in the manner indicated in the said figure. The sheet metal blank thus formed is then subjected to the action of suitable dies which bend the portions 20 thereof downwardly along curved lines 21 to form the downwardly depending curved side members 22, see Figs. 2, 3 and 4, which members are adapted to be engaged by the sides of the eggs, as is clearly illustrated in the said Figs. 3 and 4. The said die also bends downwardly the end members 23 with which the blank 17 is provided to form downwardly extending end members 24 in the finished tray. The edge portions 25 of the said blank are also bent downwardly and the corners suitably secured together as by means of the rivets 26 thereby forming the supporting walls 9 and 10 of the tray above mentioned.

The trays thus formed, as will be readily apparent from Figs. 2, 3 and 4, are adapted to receive eggs of various sizes, and due to the curvature given to the depending members 22 the side portions will rest thereon, although the lowermost portions thereof will project through the open space between the said depending members 22 and will contact with the stationary plates 8 within the container. It thus results that whenever the trays 11 are moved in a longitudinal direction relative to the said plates by means of the pull member 13 and its associated connections that the eggs contained in the said trays will be rotated through part of a revolution whereby the yolks of the said eggs may be maintained in the desired central location within the shell, just as was the case in the said prior Nichols patent. On the other hand due to the curved depending portions 22 which support the said eggs the latter may be withdrawn from the container at any time in large numbers by merely lifting one or more of the trays from its position therein. Furthermore, the supporting depending portions 22 of the trays effectively prevent the turning of small eggs so that their major axes are parallel to the line of movement of the said trays.

It is of course understood that the container 6 is filled with a suitable preserving fluid, such for example, as a solution of sodium silicate, in a manner similar to that employed in the Nichols patent.

It is obvious that those skilled in the art may vary the details of construction as well as the arrangement of the parts without departing from the spirit of the invention, and therefore, it is not wished to be limited by the above disclosure except as may be required by the claims.

What I claim is:—

1. A tray or frame of the class described provided with openings through which a portion of an egg may pass whereby it may contact with a surface adapted to cause it to revolve about its major axis, said openings having edges provided with curved depending portions adapted to engage and support other portions of said egg, whereby it may be prevented from turning about its minor axis.

2. A tray or frame of the class described comprising a sheet metal plate provided with openings through which a portion of an egg may pass, whereby it may contact with a surface adapted to cause it to revolve, said openings having edges provided with stamped curved depending portions adapted to engage and support other portions of said egg whereby it may be lifted out of contact with said surface.

3. A tray or frame of the class described comprising a sheet metal plate provided with openings through which a portion of an egg may pass, whereby it may contact with a surface adapted to cause it to revolve, said openings having edges provided with stamped curved depending portions adapted to engage and support other portions of said egg whereby it may be lifted out of contact with said surface, said plate being also provided with downwardly extending side and end walls adapted to rest on said surface.

In testimony whereof I affix my signature.

GEORGE H. BENEDICT.